(12) United States Patent
Chen et al.

(10) Patent No.: US 7,487,352 B2
(45) Date of Patent: Feb. 3, 2009

(54) ARCHITECTURE FOR MANUFACTURING AUTHENTICATABLE GAMING SYSTEMS

(75) Inventors: Ling Tony Chen, Bellevue, WA (US); Boyd C. Multerer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 284 days.

(21) Appl. No.: 11/047,176

(22) Filed: Jan. 31, 2005

(65) Prior Publication Data

US 2005/0129237 A1 Jun. 16, 2005

Related U.S. Application Data

(63) Continuation of application No. 10/011,253, filed on Nov. 13, 2001, now Pat. No. 7,203,835.

(51) Int. Cl.
*H04K 1/00* (2006.01)
*H04L 9/00* (2006.01)

(52) U.S. Cl. .................. 713/168; 380/251; 380/259

(58) Field of Classification Search ................ 713/168; 380/259, 282, 251; 463/36
See application file for complete search history.

(56) References Cited

U.S. PATENT DOCUMENTS

| | | |
|---|---|---|
| 4,296,476 A | 10/1981 | Mayer et al. |
| 4,432,067 A | 2/1984 | Nielsen |
| 4,905,280 A | 2/1990 | Wiedemer |
| 5,382,983 A | 1/1995 | Kwoh et al. |
| 5,393,072 A | 2/1995 | Best |
| 5,459,487 A | 10/1995 | Bouton |
| 5,475,835 A | 12/1995 | Hickey |
| 5,550,575 A | 8/1996 | West et al. |
| 5,551,701 A | 9/1996 | Bouton et al. |
| 5,557,541 A | 9/1996 | Schulhof et al. |
| 5,558,339 A | 9/1996 | Perlman |
| 5,592,651 A | 1/1997 | Rackman |
| 5,598,276 A | 1/1997 | Cookson et al. |
| 5,611,066 A | 3/1997 | Keele et al. |
| 5,634,849 A | 6/1997 | Abecassis |
| 5,649,862 A | 7/1997 | Sakaguchi et al. |
| 5,659,742 A | 8/1997 | Beattie et al. |
| 5,680,323 A | 10/1997 | Barnard |
| 5,706,510 A | 1/1998 | Burgoon |
| 5,716,273 A | 2/1998 | Yuen |
| 5,726,909 A | 3/1998 | Krikorian |

(Continued)

FOREIGN PATENT DOCUMENTS

CA  2201276  9/1998

(Continued)

OTHER PUBLICATIONS http://modchip.aeug.org/faq.html, year 1999.*

(Continued)

*Primary Examiner*—David Y Jung
(74) *Attorney, Agent, or Firm*—Lee & Hayes, PLLC

(57) ABSTRACT

An architecture is described to manufacture console-based gaming systems in a manner that allows them to be authenticated to a remote entity for online participation. The architecture involves placing pre-established secrets on the game console during console manufacturing that may be subsequently used to guarantee the authenticity of the game console during registration time.

6 Claims, 8 Drawing Sheets

U.S. PATENT DOCUMENTS

| | | | |
|---|---|---|---|
| 5,735,744 A | 4/1998 | Okamoto |
| 5,745,574 A | 4/1998 | Muftic |
| 5,752,883 A | 5/1998 | Butcher et al. |
| 5,791,992 A | 8/1998 | Crump et al. |
| 5,798,921 A | 8/1998 | Johnson et al. |
| 5,835,759 A | 11/1998 | Moore et al. |
| 5,841,979 A | 11/1998 | Schulhof et al. |
| 5,872,915 A | 2/1999 | Dykes et al. |
| 5,876,286 A | 3/1999 | Lee |
| 5,878,134 A | 3/1999 | Handelman et al. |
| 5,892,900 A | 4/1999 | Ginter et al. |
| 5,896,125 A | 4/1999 | Niedzwiecki |
| 5,915,238 A | 6/1999 | Tjaden |
| 5,917,256 A | 6/1999 | Broadbent, II |
| 5,918,223 A | 6/1999 | Blum et al. |
| 5,946,278 A | 8/1999 | Tower |
| 5,969,283 A | 10/1999 | Looney et al. |
| 5,973,683 A | 10/1999 | Cragun et al. |
| 5,978,920 A | 11/1999 | Lee |
| 5,980,261 A | 11/1999 | Mino et al. |
| 5,993,319 A | 11/1999 | Aoyama |
| 6,001,015 A | 12/1999 | Nishiumi et al. |
| 6,005,597 A | 12/1999 | Barrett et al. |
| 6,009,433 A | 12/1999 | Kurano et al. |
| 6,011,758 A | 1/2000 | Dockes et al. |
| 6,012,068 A | 1/2000 | Boezeman et al. |
| 6,022,274 A | 2/2000 | Takeda et al. |
| 6,025,869 A | 2/2000 | Stas et al. |
| 6,031,795 A | 2/2000 | Wehmeyer |
| 6,043,818 A | 3/2000 | Nakano et al. |
| 6,065,020 A | 5/2000 | Dussud |
| 6,093,880 A | 7/2000 | Arnalds |
| 6,115,079 A | 9/2000 | McRae |
| 6,119,116 A | 9/2000 | Rose |
| 6,122,617 A | 9/2000 | Tjaden |
| 6,128,255 A | 10/2000 | Yankowski |
| 6,128,625 A | 10/2000 | Yankowski |
| 6,147,940 A | 11/2000 | Yankowski |
| 6,161,185 A | 12/2000 | Guthrie et al. |
| 6,181,336 B1 | 1/2001 | Chiu et al. |
| 6,189,096 B1 | 2/2001 | Haverty |
| 6,224,485 B1 | 5/2001 | Dickinson et al. |
| 6,230,320 B1 | 5/2001 | Gakumura |
| 6,280,327 B1 | 8/2001 | Leifer et al. |
| 6,280,329 B1 | 8/2001 | Kondo et al. |
| 6,292,892 B1 | 9/2001 | Davis |
| 6,298,441 B1 | 10/2001 | Handelman et al. |
| 6,299,535 B1 | 10/2001 | Tanaka |
| 6,309,301 B1 | 10/2001 | Sano |
| 6,312,336 B1 | 11/2001 | Handelman et al. |
| 6,320,320 B1 | 11/2001 | Bailey, III et al. |
| 6,393,340 B2 | 5/2002 | Funda et al. |
| 6,396,531 B1 | 5/2002 | Gerszberg et al. |
| 6,464,585 B1 | 10/2002 | Miyamoto et al. |
| 6,468,160 B2 | 10/2002 | Eliott |
| 6,502,111 B1 | 12/2002 | Dussud |
| 6,520,890 B2 | 2/2003 | Hsu |
| 6,535,269 B2 | 3/2003 | Sherman et al. |
| 6,540,614 B1 | 4/2003 | Nishino et al. |
| 6,564,056 B1 * | 5/2003 | Fitzgerald ................. 340/5.1 |
| 6,599,194 B1 | 7/2003 | Smith et al. |
| 6,601,171 B1 | 7/2003 | Carter et al. |
| 6,712,704 B2 | 3/2004 | Eliott |
| 6,716,102 B2 | 4/2004 | Whitten et al. |
| 6,769,989 B2 | 8/2004 | Smith et al. |
| 6,875,021 B2 | 4/2005 | Okamoto |
| 6,928,433 B2 | 8/2005 | Goodman et al. |
| 6,935,952 B2 | 8/2005 | Walker et al. |
| 7,126,584 B1 | 10/2006 | Nishiumi et al. |
| 7,218,739 B2 | 5/2007 | Multerer et al. |
| 2001/0004609 A1 | 6/2001 | Walker et al. |
| 2002/0071557 A1 | 6/2002 | Nguyen |
| 2002/0077177 A1 | 6/2002 | Elliott |
| 2002/0121297 A1 | 9/2002 | Li et al. |
| 2002/0152377 A1 | 10/2002 | Bauman et al. |
| 2003/0008715 A1 | 1/2003 | Huber et al. |
| 2003/0078097 A1 | 4/2003 | Okamoto |
| 2003/0227473 A1 | 12/2003 | Shih et al. |
| 2004/0005924 A1 | 1/2004 | Watatbe et al. |
| 2004/0162137 A1 | 8/2004 | Eliott |

FOREIGN PATENT DOCUMENTS

| | | |
|---|---|---|
| DE | 100 46 437 | 4/2002 |
| EP | 0762260 | 3/1997 |
| EP | 0 809 214 A | 11/1997 |
| EP | 0889420 | 1/1999 |
| EP | 0 998 966 A | 5/2000 |
| EP | 1 035 706 | 9/2000 |
| EP | 1126425 | 8/2001 |
| FR | 2 743 434 A | 7/1997 |
| JP | 64010467 | 1/1989 |
| JP | 3135636 | 6/1991 |
| JP | 0661390 | 8/1994 |
| JP | 06301609 | 10/1994 |
| JP | 7160467 | 6/1995 |
| JP | 7249283 | 9/1995 |
| JP | 8016554 | 1/1996 |
| JP | 10243015 | 9/1998 |
| JP | 10260939 | 9/1998 |
| JP | 10327147 | 12/1998 |
| JP | 11207034 | 8/1999 |
| JP | 11237941 | 8/1999 |
| JP | 11317061 | 11/1999 |
| JP | 2000070547 | 3/2000 |
| JP | 2000107424 | 4/2000 |
| JP | 2000149386 | 5/2000 |
| JP | 2000157724 | 6/2000 |
| JP | 2000228051 | 8/2000 |
| JP | 2000511378 T | 8/2000 |
| JP | 2000348466 | 12/2000 |
| JP | 2001058087 | 3/2001 |
| JP | 01201746 | 7/2001 |
| JP | 2001325134 | 11/2001 |
| JP | 07039649 | 2/2007 |
| WO | WO9714151 | 4/1997 |
| WO | WO9746016 | 12/1997 |
| WO | WO 98/56179 | 12/1998 |
| WO | WO0033572 | 6/2000 |
| WO | WO 0040027 | 7/2000 |
| WO | WO 00/51036 | 9/2000 |
| WO | WO 01/05477 | 1/2001 |
| WO | WO 01/08148 | 2/2001 |
| WO | WO 01/84768 | 11/2001 |

OTHER PUBLICATIONS http://www.sun.com/blueprints/0801/publickey.pdf, online year 2001, published year 1999.*
SegaNet—Wikipedia; printed out 2008.*
Download details_ Channel 9 Boyd Multerer; printed out year 2008.*
Login to Internet Websites by Next Generation Game Console Mohammad Shirali-Shahreza; Internet, 2006 2nd IEEE/IFIP International Conference in Central Asia on Sep. 2006 pp. 1-4.*
Evolutions in Gaming Voth, D.; Pervasive Computing, IEEE vol. 6, Issue 2, Apr.-Jun. 2007 pp. 7-10.*
Xbox Live—Wikipedia; printed out year 2008.*
History of massively multiplayer online games—Wikipedia; printed out year 2008.*
"DFU Vergindung herstellen" FAQ, 'Online! XP002318226 Retrieved from the Internet: URL:www.puretec.de> 'retrieved on 2000!, 1 page.
Sherman, S.A. et al., "Secure network Access Using Multiple Applications of AT&T's Smart Card",AT&T Technical Journal, American Telephone and Telegraph Co. New York, US, vol. 73, No. 5, Sep. 1, 1994, pp. 61-72, XP000475912 ISSN: 8756-2324.

Schneier, B. "Applied Cryptography", Applied Cryptography. Protocols, Algorithms and Source Code in C, New York, John Wiley & Sons, US, 1996, pp. 574-577.

Schneier, "Applied Cryptography," John Wiley & Sons, Second Edition, 1996, pp. 32 and 33.

Getting Started Windows98, 2nd Edition, Microsoft Corporation, pp. 80-81 and 87-90.

Hall et al., "Remote Electronic Gambling" Computer Security Applications Conference, 1997. Proceedings., 13th Annual Dec. 8-12, 1997 pp. 232-238.

Jimbo et al., "Optimal Authentication Systems and Combinatorial Designs" Information Theory, IEEE Transactions on vol. 36, Issue 1, Jan. 1990 pp. 54-62.

Nacira et al., "Secured Net-Banking by /spl thera/-Vigenere in Syverson's Protocol" Computer Systems and Applications, 2005. The 3rd ACS/IEEE International Conference on 2005. p. 67.

"TV Incapable of Displaying Images", Nikkei Electronics, May 22, 2000 Issue, Japan, Nikkei Business Publications, Inc., May 22, 2000, No. 770, pp. 141-158.

"Playstation 2, Dreamcast, and 64DD: Aiming at Increasing Customers by Integration with the Net", Nikkei Trendy, No. 169, Japan, Nikkei Home Publishing Inc., Jul. 25, 2000, Extra Edition/Serial No. 169, pp. 16-19.

"XBOX, ASCII, the March issue, 2001 (The Anatomy of XBOX which is Inaccessable to the Readers of Game Magazines: The Latest Information of the War for TV Viewers at the Present Stage in 21st Century", ASCII Corporation., Mar. 1, 2001, vol. 25, No. 3, pp. 249-264.

U.S. Appl. No. 60/201,163, filed on May 2, 2000, Shih, et al., "Real Time Incorporation of Personalized Audio into Video Game".

U.S. Appl. No. 60/252,760, filed on Nov. 22, 2000, Shih, et al., "Real Time Incorporation of Personalized Audio into Video Game".

PCT Application No. PCT/US01/14106, filed on May 2, 2001, Shih, et al., "Real Time Audio in Video Game".

Bolosky et al., "Single Instance Storage in Windows 2000" Proceedings of the Usenix Windows Systems Symposium, vol. 4, Aug. 3, 2000, pp. 13-21.

"Sega Dreamcast User Manual", retrieved on Oct. 16, 2006 at <<http://www/gamemanuals.net/download/11eed12c65503f83e99b0c58bd7450bd/Dreamcast_(EN)_[Hardware].pdf>>, The Game Manual, Sep. 9, 1999, pp. 2-31.

Cleef, "Playstation Mod Chip FAQ", at <<http://modchip.aeug.org/faq.html>>, 1999, pp. 6.

Gong, "Enclaves: Enabling Secure Collaboration Over the Internet", IEEE, vol. 15, No. 3, 1997, pp. 5679575.

Weise, "Public Key Infrastructure Overview", Sun Microsystems, Inc., 2001, pp. 29.

Kasahara, "Follow-up Reporti Operational Verification of Pentium III-compatible Application & Compatible Chip Mother," DOS/V Magazine, Softbank Publishing Inc., May 1, 1999, vol. 8, No. 9, pp. 130-137.

Official Notice of Rejection for Japanese patent application No. 2006-172872 mailed on Sep. 14, 2007, 8 pgs.

"Exploring Reality of X-Box Microsoft Game Machine", Personal Computer Journal "Monthly ASCII", Japan, ASCII Corporation, May 1, 2000, vol. 24/No. 5/ Serial Volume No. 275, pp. 204-209, ISSN-0386 to 5428.

"Invisible Television", Nikkei Electronics, Japan, Nikkei BP Inc. May 22, 2000, No. 770, pp. 141-158.

Official Notice of Rejection for Japanese patent application No. 2002-066040 mailed on Mar. 24, 2006, 13 pgs.

Official Notice of Rejection for Japanese patent application No. 2002-064294 mailed on Mar. 24, 2006, 16 pgs.

Tyson, "How BIOS Works," retrieved at <<http://web.archive.org/web/20030412194913/http:/computer.howstuffworks.com/bios.ht>> on Jan. 3, 2008, published Apr. 12, 2003, pp. 1-3.

Takahasi, "Microsoft goes gaming; (Product Development);" Electronic Business; May 2000; 2 pages.

Press Pass; "Xbox to Deliver Ultimate Console Gaming Experience"; San Jose, CA; Mar. 10, 2000; 3 pages; 2001.

IGN.com; "What is the 64DD?" Sep. 17, 1997; 9 pages.

IGN.com; "The 64DD: Nintendo's Disk Drive-Everything you ever wanted to know about the N64's first major add-on"; Jan. 28, 1998; 7 pages.

IGN.com; "IGN64's Ultimate 64DD FAQ-Everything you ever wanted to know about the upcoming disk drive add-on; Updated: 12/13"; Dec. 15, 1999; 12 pages.

IGN.com; "The 64DD Connection-Here's how the 64DD and the Nintendo 64 connect;" Oct. 20, 1999; 5 pages.

c/netNews.com; "U.S. version of Playstation 2 to have modem, hard drive;" By Bloomberg News; Apr. 14, 2000; 2 pages.

ZDNetUKNEWS, Rick Lehrbaum, LinuxDEvices.com; Special to ZDNet; "Linux fuels game console plus"; Jul. 7, 2000; 3 pages.

CNET Gamecenter.com; Todd Mowatt; Indrema: Linux-Based Consloe; Aug. 11, 2000; 2 pages.

Planet GeForce; "Interviews-John Gildred of Indrema on the L600;" Interviewed by Christopher "Razor" Gordon; Oct. 19, 2000; 5 pages.

Links 386CD; 1995; Access Software, Inc.; pp. 1-87.

Web page printout, Daily Radar.com; Nov. 13, 2000; Review of "Metropolis Street Racer" game, 5 pages.

User Manual, "Metropolis Street Race" game, SEGA Enterprises, Ltd., 2000, 18 pages.

Stallings, Cryptography and network security, 1999, pp. 330, 335, and 337-338.

Melissa J. Perenson; "Play Back Media Your Way", PC World 'Online! Jun. 1, 2000 Retrieved from the Internet: url:http://www.pcworld.com/resource/printable/0aid1700100.asp. retrieved on Jul. 8, 2004.

Paul Thurrot: "Windows Media Player 7 reviewed" Winsupersite 'Online! Aug. 15, 2000 Retrieved from the internet: URL:http://www.winsupersite.com/reviews/wmp7.asp. retrieved on Jun. 18, 2004.

"CES: Bill Gates zeigt die Xbox" Golem.de 'Online! Jan. 6, 2000; Retrieved from the internet: URL:http://dyn1.golem.de/cgi-bin/usisapi.d11/forprint!!id11561. retrieved Jun. 18, 2004.

"PlayStation 2 Instructions Manual" 'Online! 2000 Sony Computer Entertainment Retrieved from the internet: URL:www.playstation.com. retrieved on Jun. 8, 2004.

"PS2 Frequently Asked Questions" All Playstation 2 'Online! Jul. 29, 2000 Retrieved from the internet: URL:http://www.allps2.net/ps2_faq.html. retrieved on Jun. 18, 2004.

Greg Suarez: "Sony PlayStation 2" The Digital Bits 'Online! Nov. 15, 2000 retrieved from the internet: URL:http://www.thedigitalbits.com/reviews/ps2/sonyps2*.html. retrieved on Jun. 8, 2004.

Quinlan, Daniel, "Filesystem Hierarchy Standard—Version 2.0" 'Online! Oct. 26, 1997, 39 pages.

Menezes, et al., "Handbook of Applied Cryptography", CRC Press LLC, 1997, p. 397.

Moda, "X-Box: Looking into the Nature of Microsoft's Game Machine", ASCII, Japan, ASCII Corporation, May 1, 2000, vol. 24, No. 5, pp. 204-209.

"This simplified Hard Disk", ASCII, Japan, ASCII Corporation, Apr. 1, 1991, vol. 15, No. 4, pp. 250-257.

European Search Report for European Patent Application No. 02025093.2 Mailed on May 15, 2008, 7 pgs.

Official Notice of Rejection for Japanese Patent Application No. 2002-064293 Mailed on Apr. 25, 2008, 12 pgs.

"Dex Drive Manual", gameshark, 1998, retrieved from <<http://www.angelfire.com/games/winospsxdexdrive/dexdrive.pdf>>, pp. 1-15.

Jones et al., "Garbage Collection, Algorithms for Automatic Dynamic Memory Management," Inter-Generational Pointers, 1996, pp. 171-173.

* cited by examiner

ARCHITECTURE FOR MANUFACTURING AUTHENTICATABLE GAMING SYSTEMS

RELATED APPLICATION

This is a continuation of U.S. patent application Ser. No. 10/011,253, which was filed Nov. 13, 2001, and is assigned to Microsoft Corporation.

TECHNICAL FIELD

This invention relates to console-based gaming systems, and more particularly, to systems and methods for manufacturing game consoles that can be authenticated for participation in online services such as online gaming.

BACKGROUND

Traditionally, gaming systems with a dedicated console were standalone machines that accommodated a limited number of players (e.g., 4). PC-based gaming grew in popularity in part due to the ability to play games online with many remote players over a network (e.g., the Internet). Thus, one trend for dedicated gaming systems is to provide broadband capabilities to facilitate online gaming.

Creating an online gaming architecture for dedicated consoles poses several unique and difficult problems. One problem is that there are a number of hackers that constantly attempt to cheat during online games to gain various gaming advantages. To defeat this cheating, various security schemes are deployed to protect the data being transmitted over the network from hacker observation and/or modification. Such schemes, however, require the game console to authenticate itself with a remote entity (e.g., online gaming server, registration server, other player system, etc.). Valid credentials are used during authentication to guarantee authenticity of network traffic during gaming. If these credentials could be easily obtained during registration, a hacker could easily manipulate the credentials and forge all network packets from the video game console using another computer. From the game server's perspective, the gaming packets appear to be authentic since it came from a network source that was capable of providing the required credentials.

Accordingly, to secure online gaming and other services, there is a need to prevent hackers from easily obtaining valid credentials for purposes of cheating or other improper uses.

SUMMARY

An architecture for manufacturing console-based gaming systems involves placing pre-established secrets on a game console during manufacturing and subsequently using the secrets to guarantee the authenticity of the game console during registration time.

Two representative implementations are described: a symmetric key architecture and a public key architecture. The former architecture involves writing a randomly generated symmetric key, along with a console ID, into programmatically accessible non volatile memory of the game console during manufacturing. The symmetric key is encrypted using a public key during transport. The corresponding private key, and the encrypted symmetric key, are securely maintained at an authentication entity.

During registration, the game console submits the key (or proof of key knowledge) and the console ID pair to the authentication entity. The pair functions as a password/name pair to locate the corresponding symmetric key maintained at the authentication entity. The private key is then used to decrypt the symmetric key. The key submitted by the game console is evaluated against the recovered symmetric key as a way to determine whether the console is authentic.

The public key architecture involves writing a private key and a digital certificate into each game console during manufacturing. The certificate contains the public key corresponding to the private key. The certificate is part of a certificate chain that includes a certification authority certificate associated with a certification authority at each manufacturing site and a root certificate from which the certification authority certificate is derived. Whenever a game console goes online for registration, a certificate chain verification process along with proof of knowledge of the private key stored on the game console are used to authenticate the console as genuine.

DETAILED DESCRIPTION

The following discussion is directed to console-based gaming systems with online connectivity and techniques for manufacturing such gaming systems in a manner that they can be authenticated by a remote authentication entity over an open network, such as the Internet. The techniques address the problem of how the authentication entity can be assured that the entity on the other side of the network is an authorized gaming system.

The discussion assumes that the reader is familiar with basic cryptography principles, such as encryption, decryption, authentication, hashing, digital signatures, and digital certificates. For a basic introduction to cryptography, the reader is directed to a text written by Bruce Schneier and entitled, "Applied Cryptography: Protocols, Algorithms, and Source Code in C," published by John Wiley & Sons, copyright 1994 (second edition 1996), which is hereby incorporated by reference.

Gaming System

Figure 1:
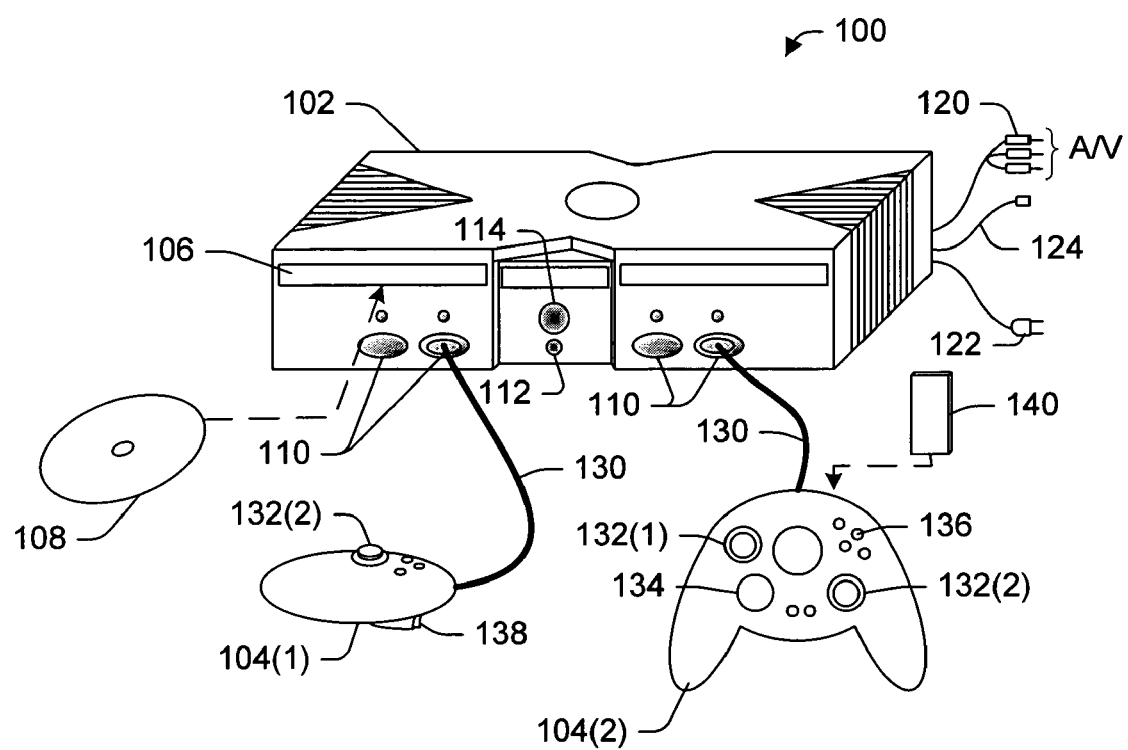
FIG. 1 illustrates a gaming system with a game console and one or more controllers.

FIG. 1 shows an exemplary gaming system 100. It includes a game console 102 and up to four controllers, as represented by controllers 104(1) and 104(2). The game console 102 is equipped with an internal hard disk drive and a portable media drive 106 that supports various forms of portable storage media as represented by optical storage disc 108.

Examples of suitable portable storage media include DVD, CD-ROM, game discs, game cartridges, and so forth.

The game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

The game console 102 connects to a television or other display (not shown) via A/V interfacing cables 120. A power cable 122 provides power to the game console. The game console 102 may further be configured with broadband capabilities, as represented by the cable or modem connector 124 to facilitate access to a network, such as the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumbsticks 132(1) and 132(2), a D-pad 134, buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and port them for play on other consoles. In the described implementation, each controller is configured to accommodate two memory units 140, although more or less than two units may be employed in other implementations.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back include:

1. Game titles played from CD and DVD discs, from the hard disk drive, or from an online source.
2. Digital music played from a CD in the portable media drive 106, from a file on the hard disk drive (e.g., Windows Media Audio (WMA) format), or from online streaming sources.
3. Digital audio/video played from a DVD disc in the portable media drive 106, from a file on the hard disk drive (e.g., Active Streaming Format), or from online streaming sources.

Figure 2:
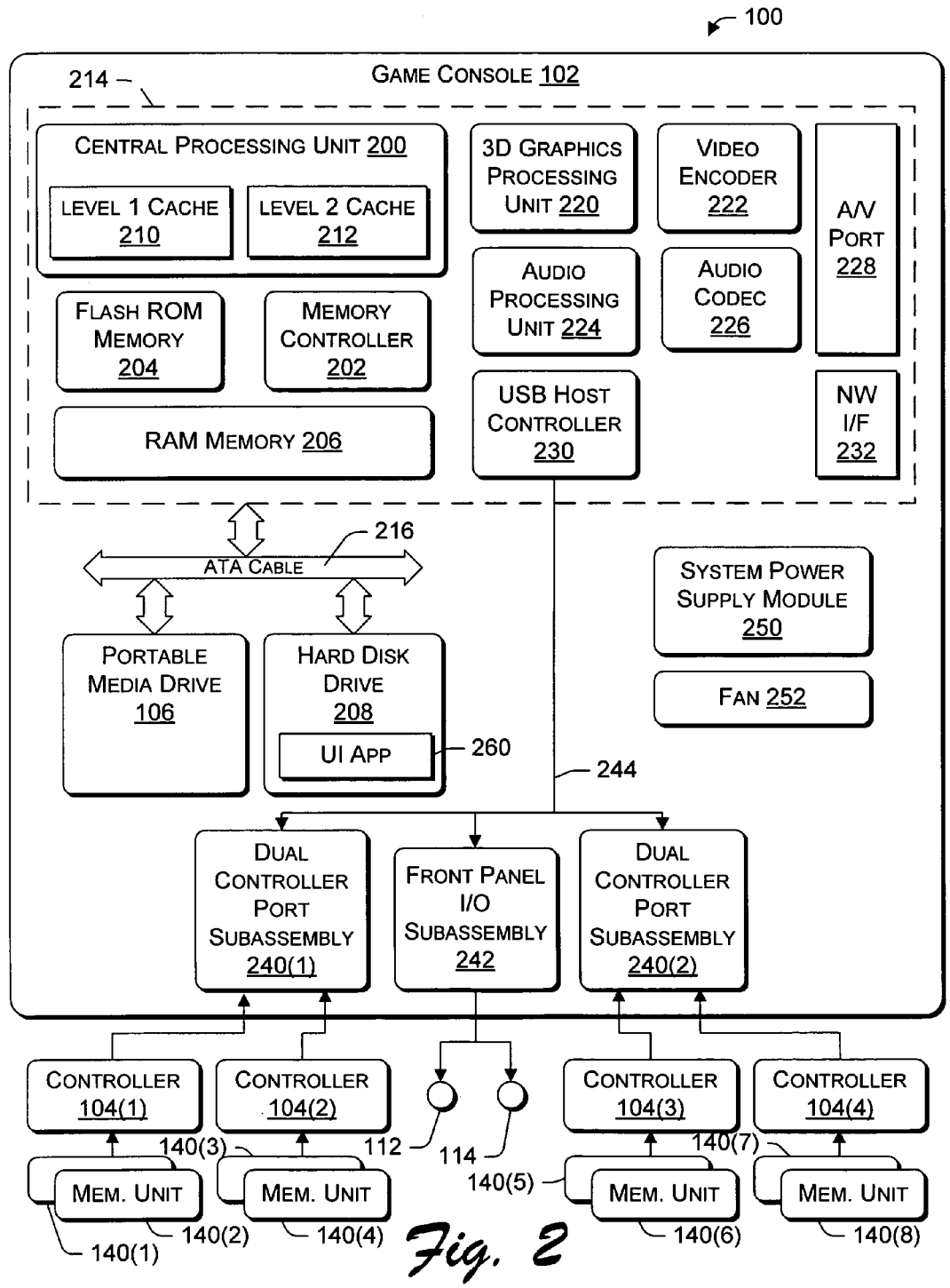
FIG. 2 is a block diagram of the gaming system.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wire or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240 (2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

A console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The game console 102 implements a cryptography engine to perform common cryptographic functions, such as encryption, decryption, authentication, digital signing, hashing, and the like. The cryptography engine may be implemented as part of the CPU 200, or in software stored on the hard disk drive 208 that executes on the CPU, so that the CPU is configured to perform the cryptographic functions.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Network Gaming

Figure 3:
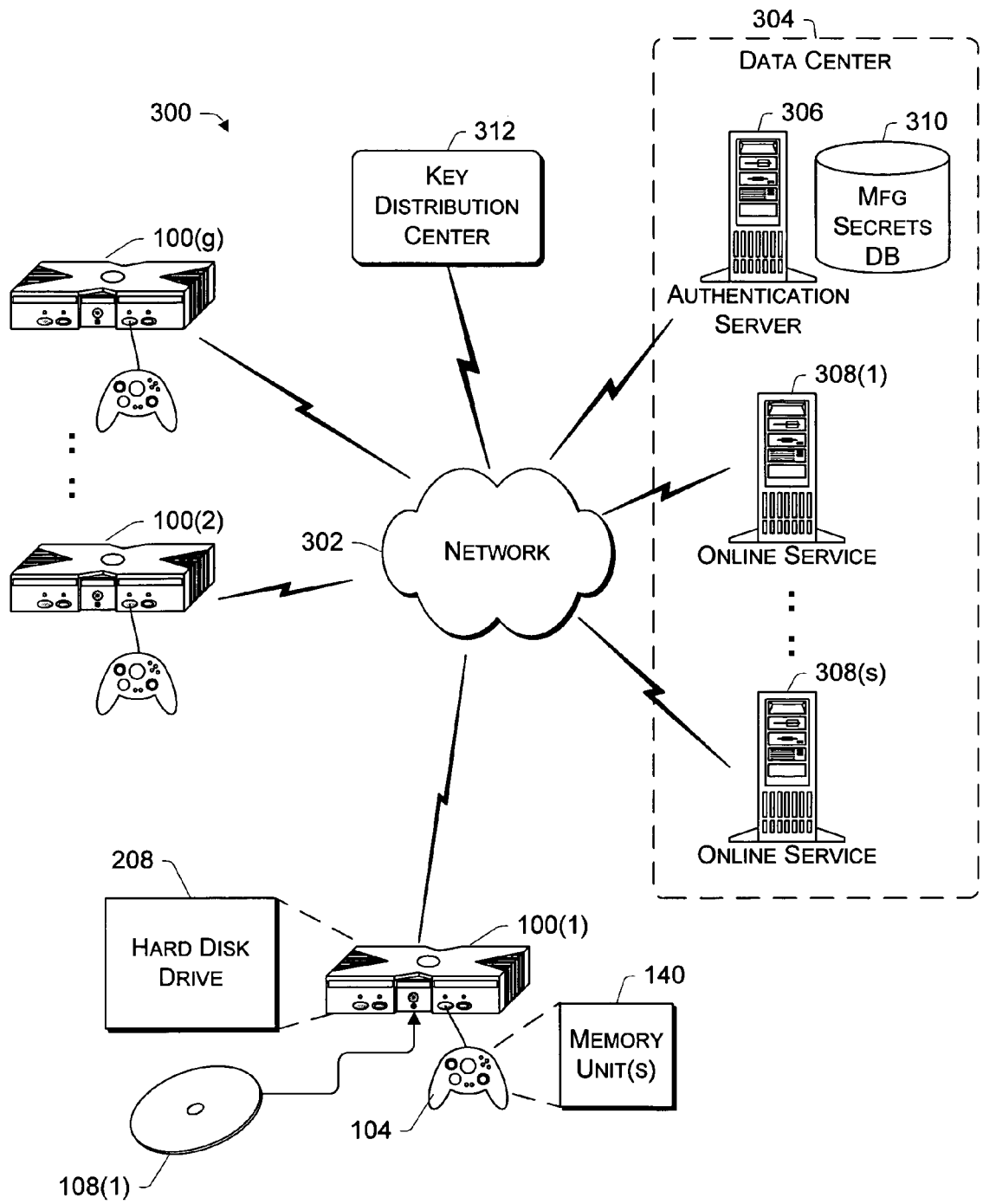
FIG. 3 illustrates a network gaming system in which the FIG. 1 gaming system is connected via a network to other consoles, services, and a ticket issuing entity.

FIG. 3 shows an exemplary network gaming environment 300 that interconnects multiple gaming systems 100(1), . . . , 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more data centers may be accessible via the network 302 to provide various services for participants. An exemplary data center 304 is illustrated as comprising an authentication server 306 that registers individual gaming systems 100 and one or more online servers 308(1), . . . , 308(s) to provide various services, such as hosting online games, serving downloadable music or video files, hosting gaming competitions, serving streaming audio/video files, and the like. The authentication server 306 has access to a database 310 that stores manufacturing secrets placed on individual gaming systems during manufacturing. These secrets are used for registering or authenticating the gaming systems prior to allowing the gaming systems to participate in online gaming or other services.

While the authentication server 306, online servers 308, and database 310 are logically grouped as forming the data center 304, it is noted that the various computer systems may or may not be physically located together or as part of the same facility. Additionally, while the authentication server 306 is illustrated separately from the online servers 308, the authentication functionality may be integrated as part of the services.

The network gaming environment 300 may further involve a key distribution center 312 that plays a role in authenticating individual players and/or gaming systems 100 to one another as well as online services 304. The distribution center 312 distributes keys and service tickets to valid participants that may then be used to form games amongst multiple players or to purchase services from the online services 308. The distribution center 312 may be integrated into the data center 304 or reside independently, as shown.

To participate in online gaming (or other network services), the gaming systems 100 first seek to be authenticated by the authentication server 306. To grant permission to participate in online services, the authentication server 306 needs to trust that each gaming system is genuine and not an imposter computing device. Authentic gaming systems 100 are manufactured with secrets that are stored in the database 310. The authentication server 306 uses these secrets to discern whether the gaming system 100 is genuine. The techniques for manufacturing gaming systems that can be authenticated for online gaming over an open network, such as the Internet, are described in the next section.

Once authenticated, the gaming systems can participate in online gaming or other services, or proceed to authenticate individual users with the key distribution center. A multi-user authentication architecture is described in more detail in U.S. patent application Ser. No. 09/802,795, entitled "Multiple User Authentication for Online Console-Based Gaming", which was filed Mar. 9, 2001. This application is assigned to Microsoft Corporation and is hereby incorporated by reference.

Manufacturing Authenticatable Gaming Systems

An architecture for manufacturing gaming systems is provided to address the console authentication problem. Simply stated, the problem is how an authentication entity can be assured that the entity on the other side of the network is an authentic game console. The architecture generally involves storing secret, authenticatable data on the game console during manufacturing and maintaining corresponding verifying data at the authentication entity. During registration, the authentication entity uses the verifying data to verify the authenticatable data submitted by the game console to determine the authenticity of the game console. Two representative architectures are described: (1) a symmetric key architecture and (2) a public key architecture.

Symmetric Key Architecture

The symmetric key architecture involves writing a randomly generated symmetric key, along with a console ID, on the game console during manufacturing. This key/ID pair subsequently functions as a password/name pair during registration to prove to the authentication server that the game console is authentic. The architecture is described with reference to FIGS. 4 and 5, where FIG. 4 illustrates the manufacturing process and FIG. 5 illustrates the registration process.

Figure 4:
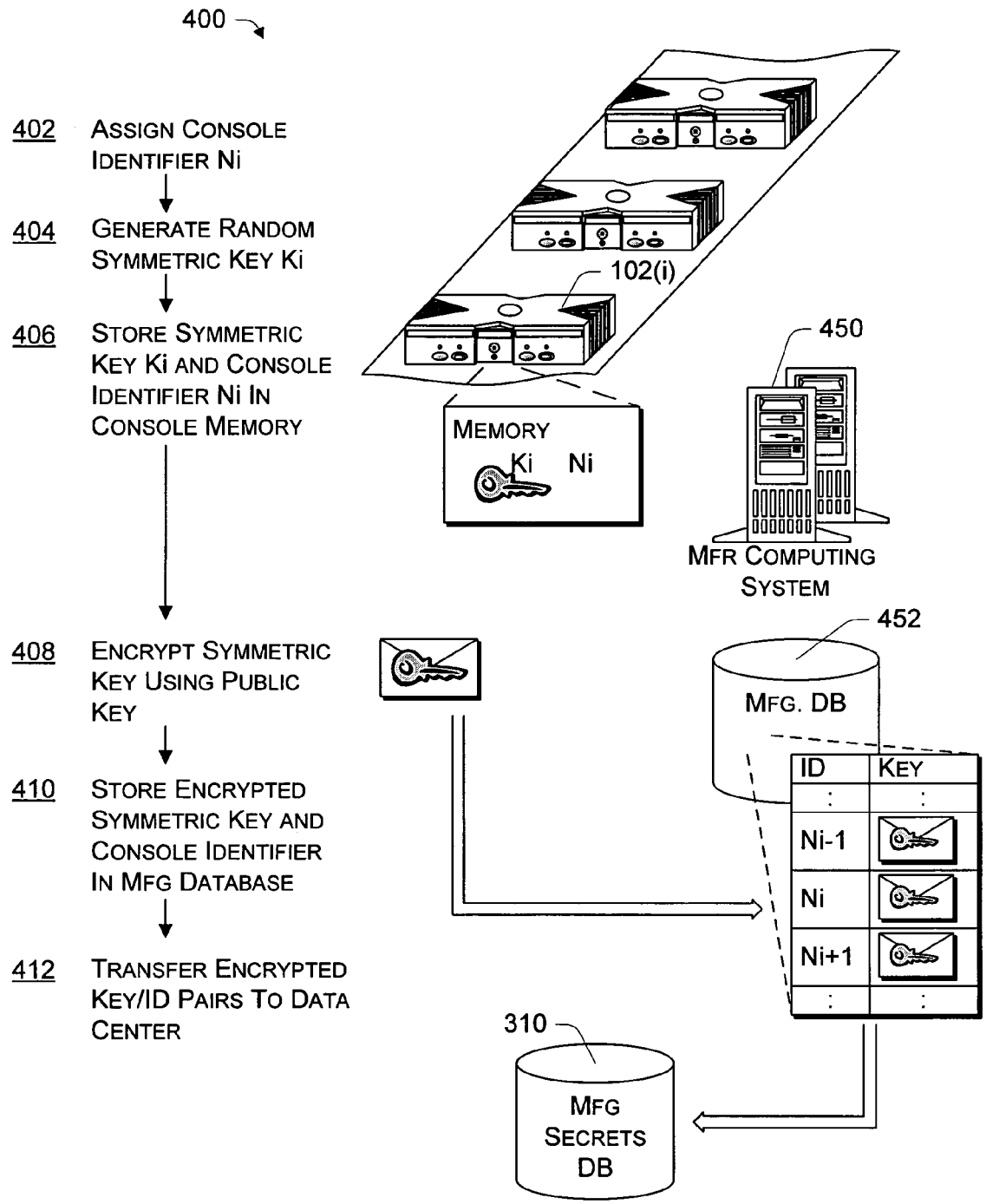
FIG. 4 illustrates a manufacturing process in which a symmetric key and a console ID are placed on the game console during manufacturing.
Figure 5:
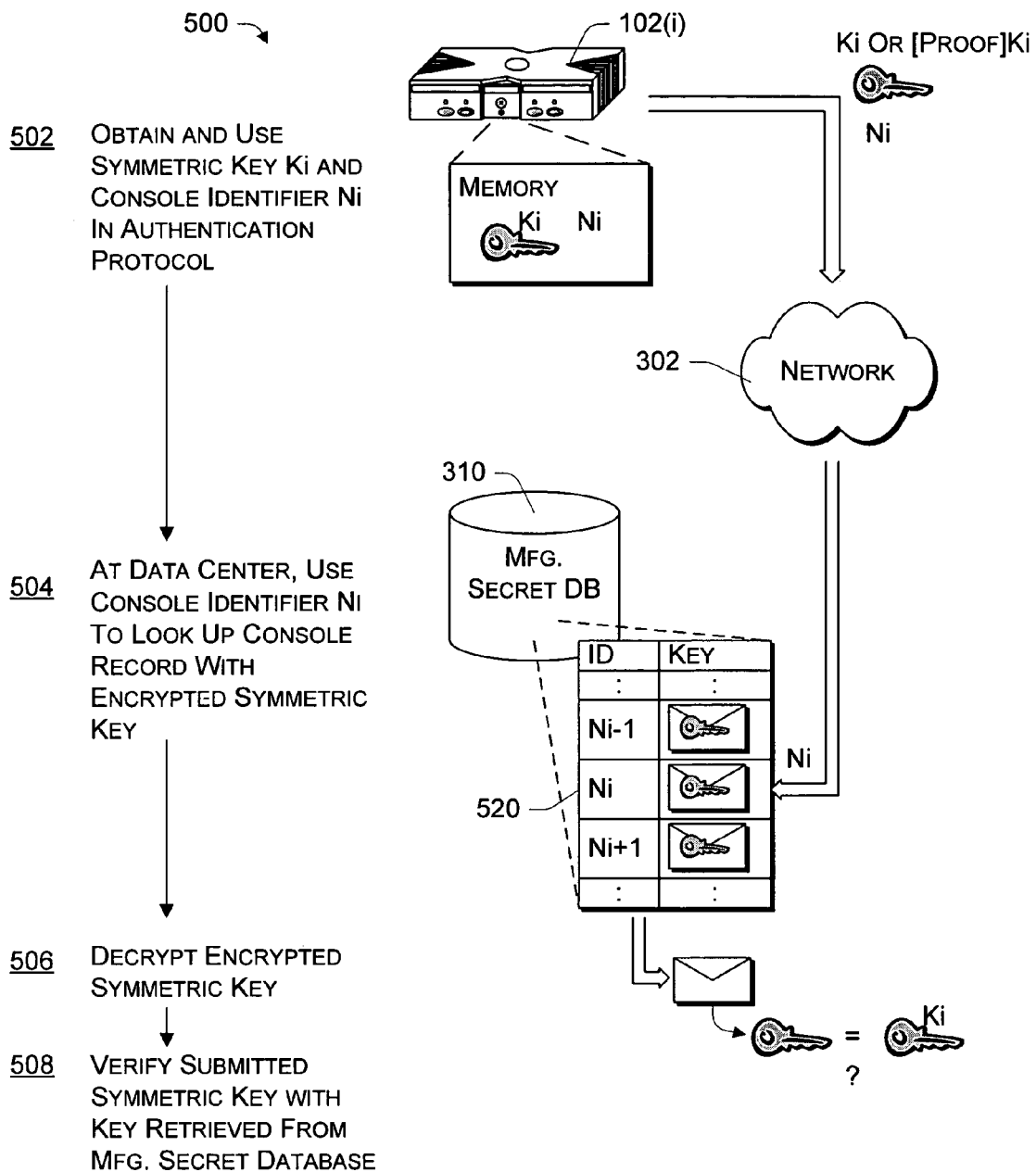
FIG. 5 illustrates a registration process in which an authentication server authenticates the game console using the symmetric key and console ID.

FIG. 4 shows an exemplary manufacturing process 400 in which a symmetric key and a console ID are placed on the game console during manufacturing. For discussion purposes, the manufacturer operates one or more manufacturing facilities, each of which includes one or more manufacturing computing systems 450 and databases 452. The manufacturing databases are sometimes referred to as "genealogy databases". The manufacturing computing systems 450 are used to program, configure, or otherwise enable the software/firmware being placed in the game consoles.

At operation 402, a unique identifier Ni is assigned for each manufactured console 102(i). The console ID could be, for example, a sequential number or the serial number of the manufactured console. At operation 404, a symmetric key Ki is randomly generated for console 102(i). At operation 406, the symmetric key Ki and the console identifier Ni are stored in a programmatically accessible non volatile memory of the console 102(i). The location of storage is preferably secure and/or secret from access by the game console owner, but is otherwise programmatically accessible by authorized game code. The possible locations include, but are not limited to, an EEPROM, the hard drive, or flash ROM. The Ki/Ni pair may also be cryptographically protected to further prevent access by the game console owner.

The Ki/Ni pair will be used during the registration process to prove to the authenticity of the game console. Accordingly, the Ki/Ni pair is collected during manufacturing for transport to the data center 304 that is responsible for registering the game console. However, the transportation and storage of the key/ID pair introduce potential risks of discovery. To secure the symmetric keys for storage and transportation, the symmetric key is encrypted with a transportation public key Kt_pub right after the symmetric key Ki is generated and stored in the game console (operation 408). The corresponding transportation private key Kt_prv, which is used to decrypt and access the symmetric key Ki, is securely maintained at the data center 304 and is only accessed when used during registration of a game console.

It is noted that one or more of the operations 404-408 may be performed by the manufacturing computing systems 450, or alternatively by the game consoles themselves. Regardless of where the key Ki is generated and encrypted, the goal is to have the key exist in its raw state for as short of time as possible. Minimizing this time will further enhance security.

It is further noted that the symmetric key Ki may be encrypted using cryptographic ciphers other than public key ciphers. For instance, the symmetric key Ki may be encrypted using a symmetric key cipher, where the symmetric key is securely maintained at the manufacturer and the data center.

At operation 410, the encrypted symmetric key (denoted as E(Kt_pub, Ki)) is stored in the manufacturer database 452 along with the console identifier Ni. At operation 412, the console identifier Ni and the encrypted symmetric key E(Kt_pub, Ki) for all manufactured consoles are transferred, individually or in batch, from the manufacturer database 452 to the data center 304. The information may be transferred according to any number of different techniques, including electronic transmission over a network, secure portage on a portable storage media, or by other means.

At this point, the game consoles are finished being manufactured and are packaged for distribution and sale. After the game consoles are purchased, the owners may wish to participate in an online service, such as gaming or downloading audio/video files. When the game consoles initially encounter an online service, the game consoles perform a registration process to prove its authenticity to the online service. For discussion purposes, suppose the game console registers with the authentication server 306 of the data center 304 to enable participation in an online gaming event being hosted by one or more online servers 308.

FIG. 5 shows an exemplary registration process 500 in which the authentication server 306 at the data center 304 authenticates the game console 102(i). At operation 502, the console 102(i) submits the symmetric key (or proof of key knowledge) and the console ID pair (e.g., Ki, Ni) to the authentication server 306 at the data center 304 as part of an authentication protocol. The symmetric key Ki is usually protected in some manner during the authentication protocol, while the console identifier Ni need not be. Many different authentication protocols can be used during this operation, including (but not limited to) Kerberos, Digest, and HTTP Basic. The communication over the network can all be optionally secured within a secure channel (e.g., SSL channel).

At operation 504, the authentication server 306 uses the console identifier Ni to lookup the associated symmetric key in the manufacturer's secrets database 310. The result of the lookup produces a data record 520 for console 102(i). The data record 520 includes the encrypted symmetric key E(Kt_pub, Ki) originally created by and transferred from the manufacturer in the manufacturing process 400 of FIG. 4. At operation 506, the authentication server 306 decrypts the symmetric key using the transportation private key Kt_prv stored at the authentication server 306 to recover the symmetric key Ki.

At operation 508, the authentication server 306 verifies the credentials submitted by the game console 102(i) by, in part, comparing the submitted key Ki (or proof of its knowledge) with the manufacturer-assigned symmetric key Ki recovered from the record 520 in the manufacturer's secrets database 310. The authentication server either accepts or rejects the game console based on whether the authentication succeeds or fails, which is based at least in part on whether the two keys match.

At this point, the results of the authentication could be used to directly allow/disallow participation in online services. In this case, the symmetric keys are used each time the game console requests authentication for purposes of participating in online services. Alternatively, the results of the authentication could be used to bootstrap a new credential process in which a new set of credentials are generated and transported back to the game console for use later during online service authentication. In this second case, the Ki/Ni pair is used only once for authentication during registration of the game console and the registration process will return a new set of credentials to the console that can be used from then on.

The advantage of the symmetric key architecture is that no secrets are maintained at the manufacturer. The secret transportation private key is kept at the data center. Thus, the opportunity for a cheater to steal the secret is greatly diminished.

Public Key Architecture

Figure 7:
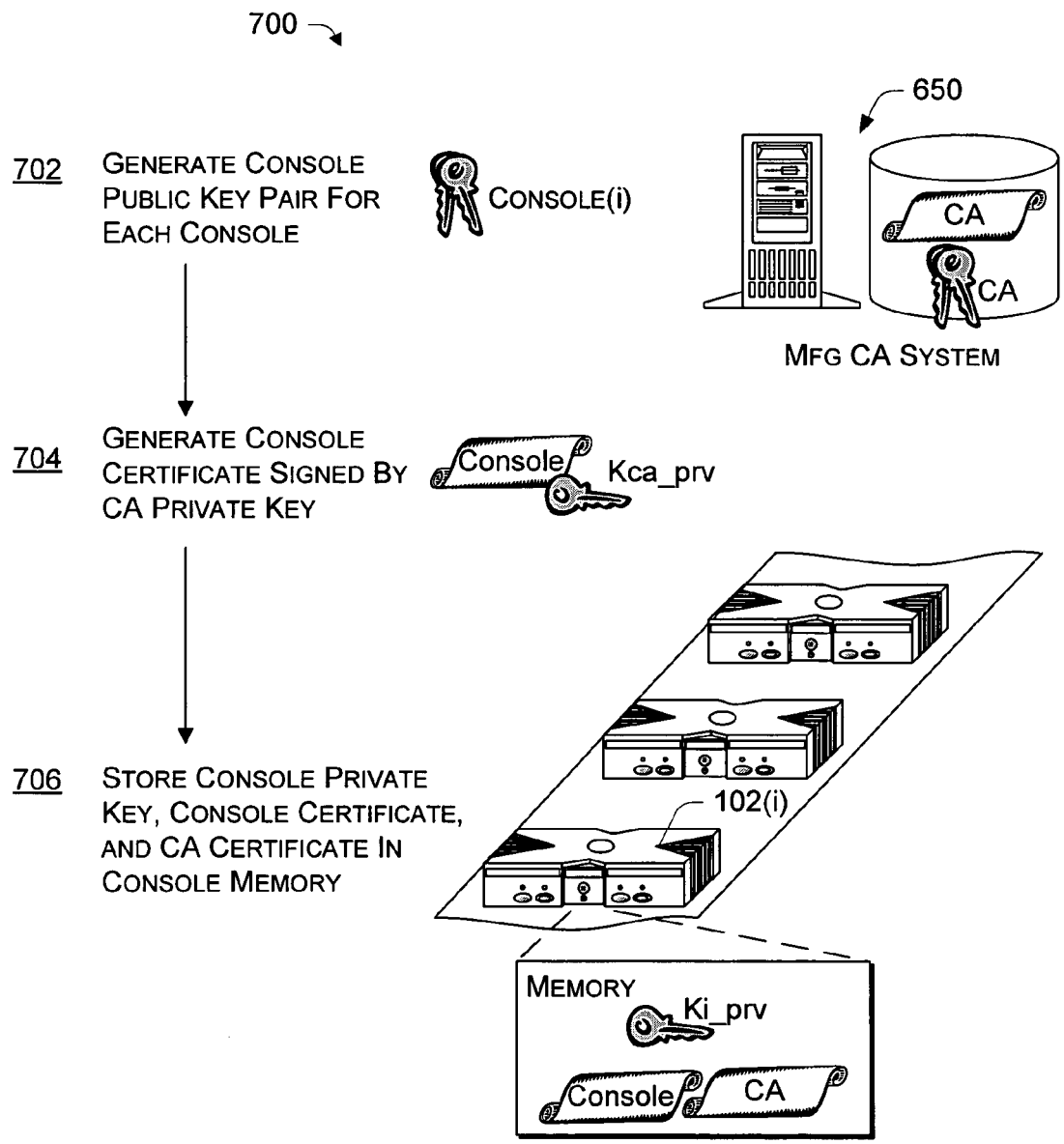
FIG. 7 illustrates a manufacturing process in which a private key and one or more certificates are placed on the game console during manufacturing.
Figure 8:
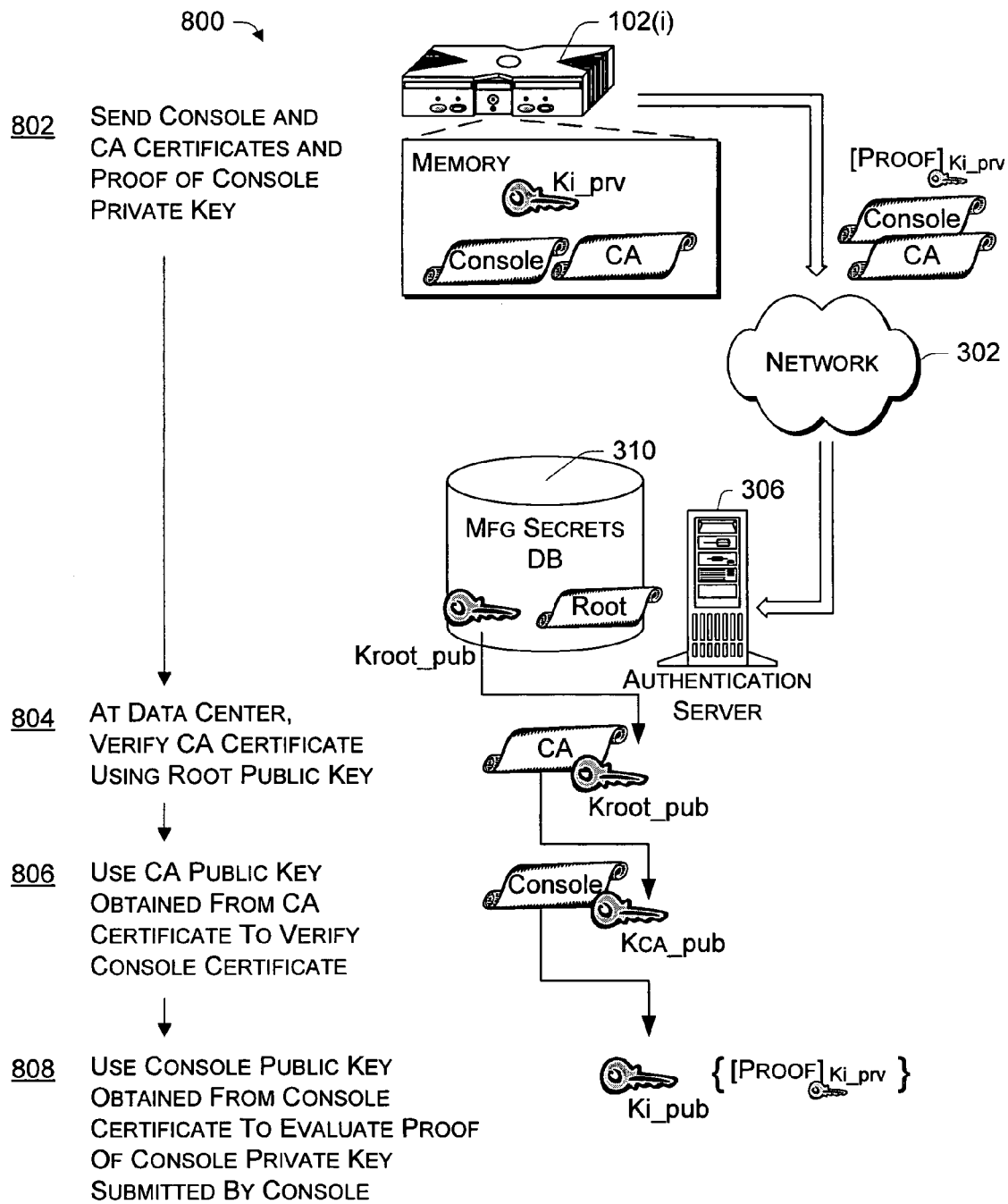
FIG. 8 illustrates a registration process in which the authentication server authenticates the game console using the private key and a certificate verification process.

The public key architecture involves writing a private key and a digital certificate into each game console during manufacturing. The certificate contains the public key that matches the private key. The certificate is signed by a certification authority placed at each manufacturing site. Each certification authority certificate is further signed by another certificate that eventually leads up a certificate chain to a root certificate. Whenever a game console goes online to register itself, a certificate chain verification process along with proof of knowledge of the private key are used to authenticate the console as genuine. The public key architecture is described with reference to FIGS. 6-8, where FIG. 6 illustrates a pre-manufacturing process, FIG. 7 illustrates the manufacturing process, and FIG. 8 illustrates the registration process.

Figure 6:
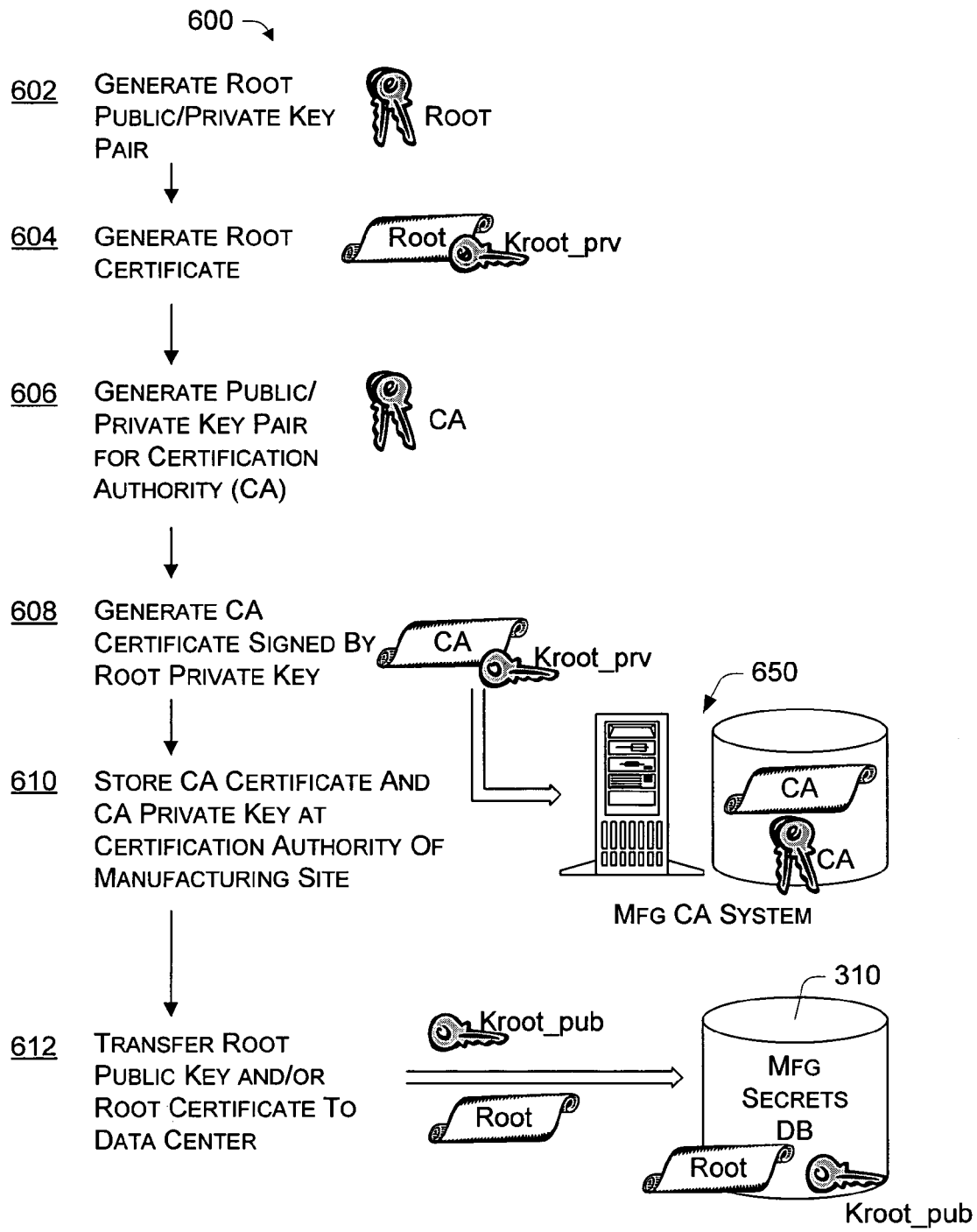
FIG. 6 illustrates a pre-manufacturing process in which public key pairs and chained certificates are initially generated.

FIG. 6 shows an exemplary pre-manufacturing process 600 in which public key pairs and chained certificates are generated. The process 600 may be performed any time before the manufacturing of the game consoles 102. It may be performed at the manufacturing facility or elsewhere. At operation 602, a root public key pair consisting of a root public key Kroot_pub and a root private key Kroot_prv is generated. The root key pair is trusted and securely stored.

At operation 604, the root key pair is used to generate a root certificate CERT(Kroot_prv, Kroot_pub). The notation "CERT(Kroot_prv, Krbotpub)" means that the root private key Kroot_prv is used to digitally sign a composite of the root public key Kroot_pub and a purpose statement vouching for the authenticity of the root public key for anyone knowing the corresponding root private key. Thus, anybody with access to the root public key Kroot_pub should be able to verify the authenticity of the certificate. One example type of certificate is an X.509 format certificate. However, other types of data structures that carry a public key signed by another private key can be considered a certificate.

At operation 606, a second public key pair is generated for use by a certification authority (CA) at the manufacturing site. This second key pair is referred to as the certification authority key pair (or CA key pair) and consists of a CA public key Kca_pub and a CA private key Kca_prv. If there is more than one certification authority at each manufacturing site, a different CA key pair is generated for each certification authority. Accordingly, each manufacturing site is associated with one or more CA key pairs.

At operation 608, a CA certificate for the certification authority is generated and signed by the root private key Kroot_prv. The CA certificate is designated as CERT(Kroot_prv, Kca_pub), meaning the root private key Kroot_prv is used to digitally sign a composite of the CA public key Kca_pub and a purpose statement vouching for the authenticity of the CA public key for anyone knowing the CA private key.

At operation 610, the CA certificate CERT(Kroot_prv, Kca_pub) and the CA private key are stored at the certification authority 650 at the manufacturing site. The CA certificate and the CA private key Kca_prv are securely maintained to prevent compromise. At operation 612, the root public key Kroot_pub and/or the root certificate CERT(Kroot_prv, Kroot_pub) is transported (if generated remotely) and securely stored to the data center 304.

FIG. 7 shows an exemplary manufacturing process 700 in which a private key and one or more certificates are placed on the game console during manufacturing. For purposes of manufacturing, the manufacturer maintains the CA public key pair (Kca_pub, Kca_prv) and the CA certificate CERT (Kroot_prv, Kca_pub).

At operation 702, a game console public key pair for each manufactured console 102(i) is generated. The console public key pair consists of a console public key Ki_pub and a console private key Ki_prv. At operation 704, a console certificate CERT(Kca_prv, Ki_pub) is generated and signed by the CA private key Kca_prv of the certification authority at the factory. The console certificate contains the console public key Ki_pub and vouches for its authenticity for anyone knowing the console private key Ki_prv.

At operation 706, the manufacturer records the console private key Ki_prv, the console certificate CERT(Kca_prv, Ki_pub), and CA certificate CERT(Kroot_prv, Kca_pub) into the game console. The location in storage is such that the key and certificates are programmatically accessible by authorized game code, but secure from being accessed by the game console owner. The possible locations include, but are not limited to, an EEPROM, hard drive, or flashable ROM. While the CA private key Kca_prv is secured at the manufacturing site, all other information including public keys and certificates can be freely distributed without security measures.

FIG. 8 shows an exemplary registration process 800 in which the game console is authenticated by the authentication server 306 at the data center 304. Many different public key authentication protocols can be employed to implement the registration process. At the time of registration, the authentication server 306 has access to the root certificate (and thus root public key).

At operation 802, as part of one suitable protocol, the console 102(i) sends the console certificate CERT(Kca_prv, Ki_pub) to the authentication server 306 at ig the data center 304. The console may optionally send the CA certificate CERT(Kroot_prv, Kca_pub) if the authentication server does not already possess the CA certificate CERT(Kroot_prv, Kca_ pub). The console also submits some proof that it knows the console private key Ki_prv. This proof can be achieved in many ways. One approach for providing such proof is to encrypt some data using the console private key Ki_prv. This data may be, for example, the current time, a random number, a message, etc. For purposes of continuing discussion, assume the console encrypts the current time with the console private key, or E(Ki_prv, CurrentTime). Using the current time can help thwart replay attacks.

Next, the authentication server 306 performs a certificate chain authentication process to traverse the certificate chain out to the console certificate. More specifically, at operation 804, the authentication server 306 authenticates the CA certificate CERT(Kroot_prv, Kca_pub) by verifying the signature of the CA certificate using root public key Kroot_pub. The root public key may be stored at the authentication server or extracted from the root certificate CERT(Kroot_prv, Kroot_pub). At operation 806, the authentication server 306 obtains the CA public key Kca_pub from the CA certificate and uses it to verify the signature of the console certificate CERT(Kca_prv, Ki_pub), thereby authenticating the console certificate.

At operation 808, the authentication server 306 uses the console public key Ki_pub retrieved from the console certificate to evaluate the proof of knowledge of the console private key Ki_prv. If the authentication server 306 can verify via the submitted proof that the console has knowledge of the correct console private key, the game console 102(i) is trusted to be genuine. In our example of using current time, the authentication server employs the console public key to decrypt the encrypted current time submitted by the console. The recovered current time is verified to be within an acceptable time skew. The game server either accepts or rejects the game console based on whether the authentication succeeds or fails, which is based at least in part on whether the recovered time is within the time skew.

At this point, the results of the authentication could be used to directly allow/disallow participation in online services. In this case, the same registration process is used each time the game console requests authentication for purposes of participating in online services. Alternatively, the results of the authentication could be used to bootstrap a new credential process in which a new set of credentials are generated and transported back to the game console for use later during online service authentication. In this second case, the console private key Ki_prv, the console certificate CERT(Kca_prv, Ki_pub), and the CA certificate CERT(Kroot_prv, Kca_pub) credentials are used only once for authentication during registration and the registration process will return a new set of credentials to the console that can be used from then on.

It is noted that the public key architecture described herein employs two levels of certificate chaining from the root certificate to the console certificate. More or fewer levels of certificate chaining may be used to deploy the architecture.

The advantage of the public key architecture is that no transfer of keys takes place between the console manufacturing sites and the authentication server at the data center. However, with the public key architecture, secrets are maintained at the manufacturer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method for registering a game console having at least programmatically accessible memory and network interfacing capability to enable access to a network, comprising:

receiving a symmetric key and a console ID from the game console;

locating a record using the console ID, the record containing an encrypted symmetric key in which an original symmetric key assigned to the game console during manufacturing is encrypted;

decrypting the encrypted symmetric key found in the record; and evaluating the original symmetric key recovered from the encrypted symmetric key with the symmetric key received from the game console as a basis for authenticating the game console.

2. A method as recited in claim 1, wherein the original symmetric key is encrypted using a public key cipher and a public key of a public key pair and the decrypting comprises decrypting the symmetric key using the public key cipher and a private key of the public key pair.

3. A method as recited in claim 1, wherein the original symmetric key is encrypted using a symmetric key cipher and the decrypting comprises decrypting the symmetric key using the symmetric key cipher.

4. One or more computer-readable media comprising computer-executable instructions that, when executed, perform the method as recited in claim 1.

5. A computer-readable medium comprising computer-executable instructions that, when executed, direct a computing system to:

receive a proffered symmetric key and a console ID from a game console having at least programmatically accessible memory and network interfacing capability to enable access to a network;

retrieve, using the console ID, an original symmetric key recorded into the game console during manufacturing; and compare the proffered symmetric key received from the game console with the original symmetric key to determine whether the game console is authentic.

6. A computer-readable medium as recited in claim 5, wherein the copy of the symmetric key is encrypted and further comprising computer-executable instructions that, when executed, direct the computing system to decrypt the copy of the original symmetric key.

* * * * *